United States Patent
Glaudel

(10) Patent No.: US 7,941,284 B1
(45) Date of Patent: May 10, 2011

(54) SYSTEMS, APPARATUSES, AND METHODS FOR MEASURING A FLUID CHARACTERISTIC USING A CORIOLIS FLOW METER

(75) Inventor: Stephen P. Glaudel, Lebanon, NJ (US)

(73) Assignee: Brooks Instrument, LLC, Hatfield, PA (US)

( * ) Notice: Subject to any disclaimer, the term of this patent is extended or adjusted under 35 U.S.C. 154(b) by 102 days.

(21) Appl. No.: 12/397,098

(22) Filed: Mar. 3, 2009

Related U.S. Application Data

(60) Provisional application No. 61/033,280, filed on Mar. 3, 2008.

(51) Int. Cl.
*G01F 1/66* (2006.01)

(52) U.S. Cl. ........................ 702/45; 73/32 A; 73/861.356

(58) Field of Classification Search .................... 702/45, 702/47, 48, 50, 54.41, 56, 75, 100, 106; 73/32 A, 73/861.355, 861.356, 861.357, 866.1; 347/249; 600/459, 508; 438/41, 50, 53, 456; 123/568.21; 324/309

See application file for complete search history.

(56) References Cited

U.S. PATENT DOCUMENTS

| | | | |
|---|---|---|---|
| 4,996,871 A * | 3/1991 | Romano | 73/32 A |
| 5,448,921 A * | 9/1995 | Cage et al. | 73/861.357 |
| 6,140,144 A | 10/2000 | Najafi et al. | |
| 6,332,366 B1 * | 12/2001 | Wray | 73/861.356 |
| 6,338,284 B1 | 1/2002 | Najafi et al. | |
| 6,373,515 B1 * | 4/2002 | Morrison | 347/249 |
| 6,467,469 B2 | 10/2002 | Yang et al. | |
| 6,477,901 B1 | 11/2002 | Tadigadapa et al. | |
| 6,499,354 B1 | 12/2002 | Najafi et al. | |
| 6,637,257 B2 | 10/2003 | Sparks | |
| 6,647,778 B2 | 11/2003 | Sparks | |
| 6,748,813 B1 | 6/2004 | Barger et al. | |
| 6,768,303 B1 | 7/2004 | Su et al. | |
| 6,824,521 B2 | 11/2004 | Rich et al. | |
| 6,844,213 B2 | 1/2005 | Sparks | |
| 6,923,625 B2 | 8/2005 | Sparks | |
| 6,926,670 B2 | 8/2005 | Rich et al. | |
| 6,932,114 B2 | 8/2005 | Sparks | |
| 6,935,010 B2 | 8/2005 | Tadigadapa et al. | |

(Continued)

OTHER PUBLICATIONS http://en.wikipedia.org/wiki/Mass_flow_meter; 4 pages, Mar. 3, 2009.

(Continued)

*Primary Examiner* — John H Le
(74) *Attorney, Agent, or Firm* — SNR Denton US LLP

(57) ABSTRACT

According to an illustrative embodiment, a system for calculating an average phase difference in a Coriolis flow meter includes a conduit for transferring a fluid. The conduit is caused to vibrate when the fluid flows through the conduit. The system also includes a first and a second detector operable to detect vibrations at first and second portions of the conduit, respectively. The first and second detectors measure the phase of the first and second vibrations, respectively. The system may also include a timer operable to measure a phase difference between the phases of the first and second vibrations, and a memory operable to store one or more values associated with a plurality of phase differences. The plurality of phase differences may include the phase difference measured by the timer. The system may also include a processor operable to calculate an average phase difference using the one or more values.

42 Claims, 4 Drawing Sheets

U.S. PATENT DOCUMENTS

| | | |
|---|---|---|
| 6,942,169 B2 | 9/2005 | Sparks |
| 6,950,760 B2 * | 9/2005 | Henry et al. .................... 702/45 |
| 6,968,743 B2 | 11/2005 | Rich et al. |
| 7,059,176 B2 | 6/2006 | Sparks |
| 7,117,751 B2 | 10/2006 | Berger et al. |
| 7,211,048 B1 | 5/2007 | Najafi et al. |
| 7,228,735 B2 | 6/2007 | Sparks et al. |
| 7,263,882 B2 | 9/2007 | Sparks et al. |
| 7,317,951 B2 | 1/2008 | Schneider et al. |
| 7,351,603 B2 | 4/2008 | Sparks et al. |
| 7,354,429 B2 | 4/2008 | Sparks et al. |
| 7,381,628 B2 | 6/2008 | Sparks et al. |
| 7,437,912 B2 | 10/2008 | Sparks et al. |

OTHER PUBLICATIONS http://en.wikipedia.org/wiki/Phase_(waves); 4 pages, Mar. 3, 2003.

Installation and Operation Manual for Brooks Model B950 Mass Flow Controller, Part No. 541B119AGH, Oct. 2008.

Installation and Operation Manual for Brooks Model 4800 Series—4850 Mass Flow Controller and 4860 Mass Flow Meter, Part No. 541B072AHG, Feb. 2008.

Installation and Operation Manual for Brooks QUANTIM Low Flow Coriolis Precision Mass Flow Measurement and Control, Part No. 541B029AGH, Jun. 2008.

D. Sparks, R. Smith, J. Cripe, R. Schneider, and N. Najafi, "A Portable MEMS Coriolis Mass Flow Sensor," IEEE Sensors Conference 2003, Toronto, Canada, No. 8.4 p. 90, Oct. 2003.

* cited by examiner

SYSTEMS, APPARATUSES, AND METHODS FOR MEASURING A FLUID CHARACTERISTIC USING A CORIOLIS FLOW METER

RELATED APPLICATIONS

The present application claims the benefit, under 35 USC §119(e), of the filing of U.S. Provisional Patent Application Ser. No. 61/033,280, entitled "System and Method for Stochastic Processing of Coriolis Flow Meter Information," filed Mar. 3, 2008. This provisional application is incorporated herein by reference for all purposes.

BACKGROUND

1. Field of the Illustrative Embodiments

The illustrative embodiments relate generally to systems, apparatuses, and methods for measuring a fluid characteristic using a Coriolis flow meter.

2. Description of the Related Art

Coriolis flow meters may be used to obtain various characteristics of a fluid. For example, a Coriolis flow meter may be used to determine the mass flow rate or density of a fluid. These characteristics may be used in a wide variety of settings. In one potential non-limiting application, a user may desire to know an amount of fluid in mass units, as opposed to volume, because volume may vary with temperature and pressure. Also, although Coriolis flow meters may be used to measure the characteristics of fluid on a larger scale, such as the flow rate of gasoline from a refinery, Coriolis flow meters may also be used to measure relatively smaller-scale fluid characteristics.

SUMMARY

According to an illustrative embodiment, a system for calculating an average phase difference in a Coriolis flow meter includes a conduit for transferring a fluid. The conduit is caused to vibrate when the fluid flows through the conduit. The system also includes a first detector operable to detect a first vibration at a first portion of the conduit. The first detector measures the phase of the first vibration. The system also includes a second detector operable to detect a second vibration at a second portion of the conduit. The second detector measures the phase of the second vibration. The system may also include a timer operable to measure a phase difference between the phase of the first vibration and the phase of the second vibration, and a memory operable to store one or more values associated with a plurality of phase differences. The plurality of phase differences may include the phase difference measured by the timer. The system may also include a processor operable to calculate an average phase difference using the one or more values.

According to another illustrative embodiment, a method for calculating an average phase difference in a Coriolis flow meter includes transferring a fluid through a conduit. The fluid causes a first portion of the conduit to vibrate in a first phase and further causes a second portion of the conduit to vibrate in a second phase. The method may also include measuring a phase difference between the first phase and the second phase, and storing one or more values associated with a plurality of phase differences in a memory. The plurality of phase differences may include the measured phase difference. The method may also include calculating an average phase difference based on the one or more values stored in the memory, and outputting the average phase difference.

DETAILED DESCRIPTION OF THE ILLUSTRATIVE EMBODIMENTS

Figure 1A:
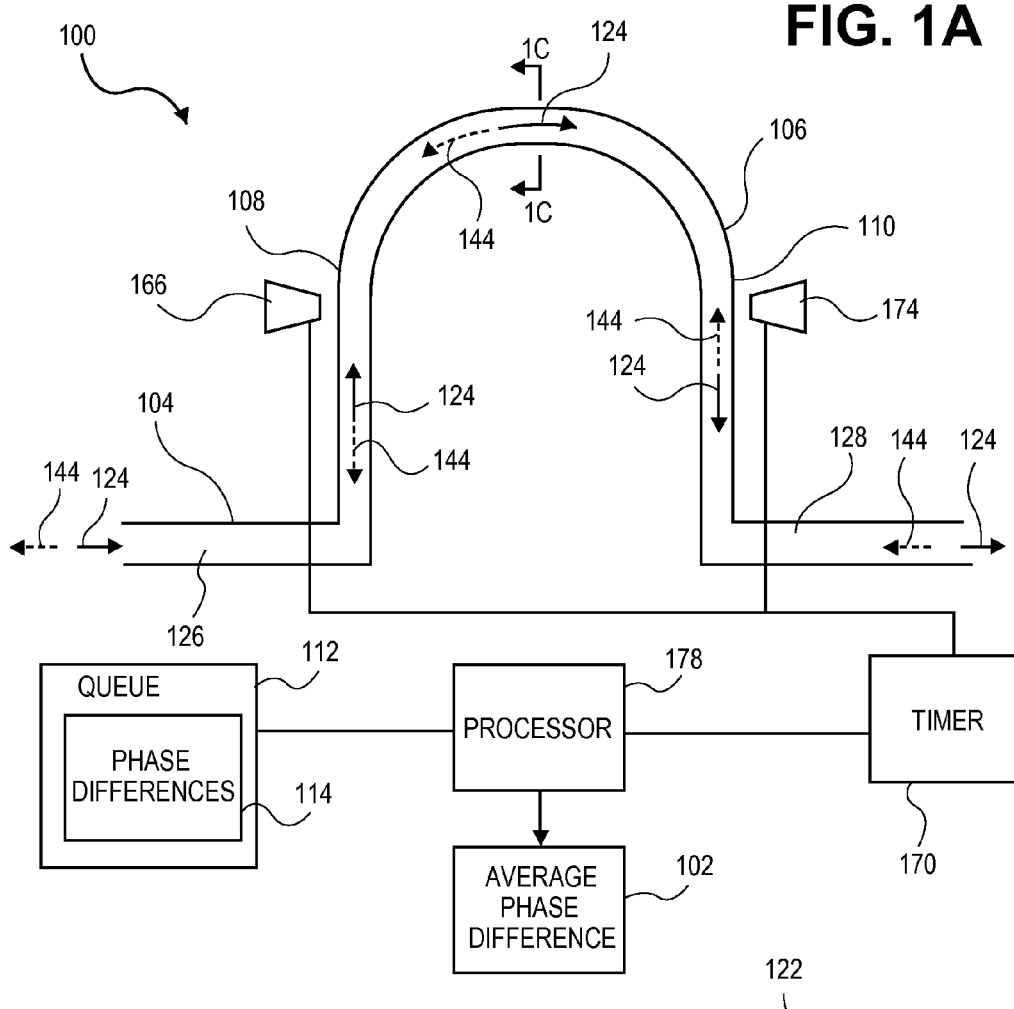
FIG. 1A is a schematic diagram of a system for calculating an average phase difference in a Coriolis flow meter according to an illustrative embodiment.

Referring to FIGS. 1-4, a system 100 for calculating an average phase difference 102 in a Coriolis flow meter 104 is shown according to an illustrative embodiment. The Coriolis flow meter 104 includes a conduit 106 that transfers fluid. The fluid may be a gas or a liquid. The flow of fluid through the conduit 106 causes a first portion 108 of the conduit 106 to vibrate out of phase with a second portion 110 of the conduit 106. In one embodiment, the system 100 measures the time at which the first portion 108 and second portion 110 are out of phase, adds this phase difference to a queue 112, and calculates the average (arithmetic mean) phase difference 102 of the phase differences 114 stored in the queue 112. This average phase difference 102 may then be outputted and used for any application, such as for calculating the mass flow of the fluid through the Coriolis flow meter 104. Unless otherwise indicated, as used herein, "or" does not require mutual exclusivity.

The conduit 106 may be made from any material that is capable of vibrating when a fluid is transferred therethrough. For example, the conduit 106 may be formed from Silicon or other semiconductor materials. In this example, the conduit 106 may be formed using Micro Electro Mechanical Systems (MEMS) technology, which is sometimes used to construct integrated circuits. The Coriolis flow meter 104 may also be any size depending on the application. In one non-limiting example, the conduit 106 is less than one inch wide and may be capable of measuring relatively small flow rates, includes flow rates of less than one gram per hour. However, the Coriolis flow meter 104 may be any size and may be capable of measuring a wide range of fluid characteristics of any magnitude.

The Coriolis flow meter 104 is also capable of having a variety of shapes and configurations. For example, although the Coriolis flow meter 104 is shown to have a single conduit 106, the Coriolis flow meter 104 may also have two or more conduits. Also, although the conduit 106 is shown to approximate a "U" shape, the conduit 106 may have any curved shape, or may be substantially straight.

Fluid may flow in either direction through the conduit 106, or may not flow at all. When no fluid flows through the conduit 106, the conduit 106 may swing back and forth along bi-directional arrows 122 such that the first portion 108 and the second portion 110 vibrate substantially in phase with one another. Also, when no fluid flows through the conduit 106, little or no twisting of the conduit 106 occurs. The relationship between the phases of vibration of the first and second portions 108 and 110 when fluid is not flowing through the conduit 106 is shown in graph 116 in FIG. 2. In graph 116, waveform 118 schematically represents the vibration of the first portion 108 of the conduit 106, and waveform 120 schematically represents the vibration of the second portion 110 of the conduit 106. Each of the waveforms 118 and 120 is a plot of the amplitude of vibration, or displacement of the respective portion, versus time. As shown in the graph 116, when no fluid flows through the conduit, the respective vibrations of the first and second portions 108 and 110 are in phase with one another, and little or no phase difference exists between the waveforms 118 and 120.

When fluid flows through the conduit 106, the conduit 106 twists such that the first portion 108 vibrates out of phase with the second portion 110. The twisting of the conduit 106 conserves the angular momentum of the fluid as the fluid passes through the conduit 106. The frequency of vibration of the conduit 106 may depend on a variety of factors, such as the size of the Coriolis flow meter 104 and the material from which the conduit 106 is formed.

In one example, fluid may flow through the Coriolis flow meter 104 in the direction indicated by arrows 124. In this example, the fluid flows through a straight portion 126 of the Coriolis flow meter 104 and into the first portion 108 of the conduit 106, and then flows through the second portion 110 toward a straight portion 128 of the conduit 106. When the fluid flows in the direction indicated by arrows 124, the first portion 108 acts as an inlet for the fluid to flow into the conduit 106, and the second portion 110 acts as an outlet for the fluid to flow out of the conduit 106.

Figure 1B:
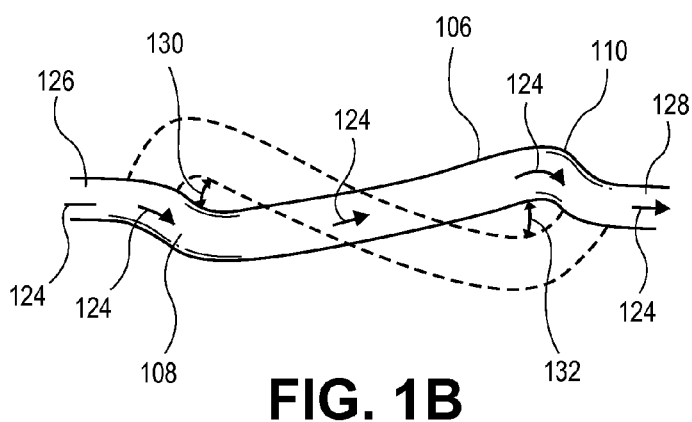
FIG. 1B is a schematic top view of the conduit in FIG. 1A according to an illustrative embodiment.
Figure 1C:
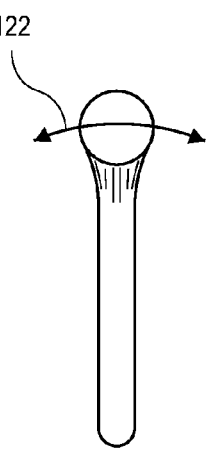
FIG. 1C is a schematic view of the conduit in FIG. 1A taken along line 1C-1C.
Figure 2:
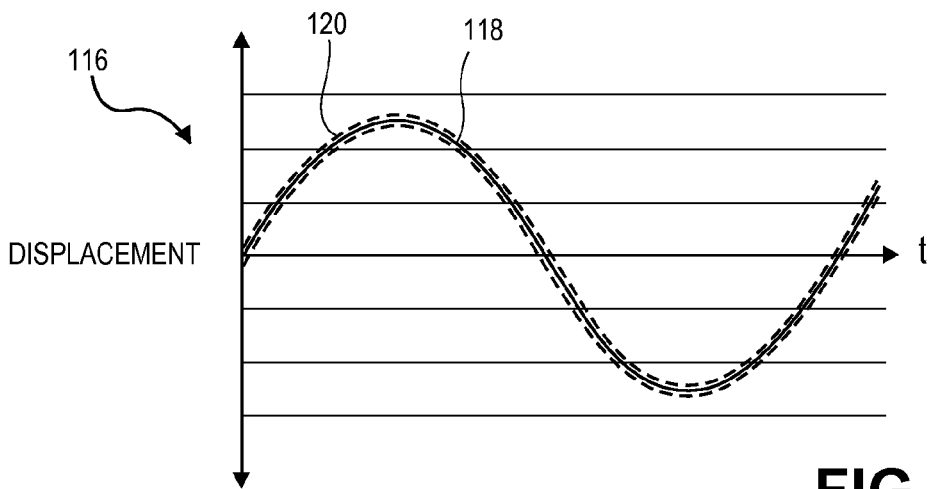
FIG. 2 is a schematic graph showing the displacement of the conduit in FIGS. 1A and 1B versus time when fluid is not flowing through the conduit.

As shown specifically in FIG. 1B, fluid flow along arrows 124 causes the conduit 106 to twist such that the first portion 108 "lags" behind the second portion 110. In particular, when fluid flows through the first portion 108 of the conduit 106, the first portion 108 may exert a force on the fluid to increase the fluid's angular momentum, thereby causing the first portion 108 to bend backwards. On the other hand, when fluid flows through the second portion 110 of the conduit 106, the second portion 110 bends forwards to decrease the fluid's angular momentum. Thus, the first and second portions 108 and 110 vibrate along bi-directional arrows 130 and 132, respectively, with the phase of the vibration of the first portion 108 lagging behind the phase of vibration of the second portion 110.

The solid and dotted schematic representations of the vibrating conduit 106 in FIG. 1B show an example of the displacements of each portion of the conduit 106 when fluid flows through conduit 106 along arrows 124. The vibrations of the first and second portions 108 and 110 are represented as waveforms 131 and 133, respectively, on graph 140 in FIG. 3A. When the vibrational characteristics of the first and second portions 108 and 110 are plotted on the graph 140, the graph 140 illustrates the "out-of-phase" relationship between the vibrations of the first and second portions 108 and 110. As fluid flows through the conduit 106, the second portion 110 of the conduit 106 leads the first portion 108 of the conduit 106 in a twisting, vibrational motion such that the second portion 110 reaches a first displacement amplitude 134 before the first portion 108 reaches a first displacement amplitude 136. Later in time, the second portion 110 reaches a second displacement amplitude 138 before the first portion 108 reaches a second displacement amplitude 139. This out-of-phase relationship causes phase differences 142 and 143 to exist between the vibrations of the first and second portions 108 and 110. As described below, the phase differences 142 and 143 may be measured in time units and used in the illustrative embodiments.

Fluid may also flow through the conduit 106 in an opposite direction as indicated by arrows 144. When the fluid flows in the direction indicated by arrows 144, the second portion 110 acts as an inlet for the fluid to flow into the conduit 106, and the first portion 108 acts as an outlet for the fluid to flow out of the conduit 106. The vibrations of the first and second portions 108 and 110 are represented as waveforms 146 and 148, respectively, on graph 150 in FIG. 4. When fluid flows along arrows 144, the first portion 108 and the second portion 110 again vibrate out-of-phase with one another. As fluid flows through the conduit 106, the first portion 108 of the conduit 106 leads the second portion 110 of the conduit 106 in a twisting, vibrational motion such that the first portion 108 reaches a first displacement amplitude 152 before the second portion 110 reaches a first displacement amplitude 154. Later in time, the first portion 108 reaches a second displacement amplitude 156 before the second portion 110 reaches a second displacement amplitude 158. This out-of-phase relationship causes phase differences 160 and 161 to exist between the vibrations of the first and second portions 108 and 110, and the phase differences 160 and 161 may be used as described in the illustrative embodiments.

As shown in graphs 140 and 150, many phase differences may exist over time as the first and second portions 108 and 110 vibrate out-of-phase with one another. For example, each time the conduit 106 goes through a full swing, two phase difference measurements may be obtained. Each of the graphs 140 and 150 show such a full swing, with the graph 140 illustrating phase differences 142 and 143, and the graph 150 illustrating phase differences 160 and 161.

Issues may arise as these vibration-periods or phase differences become shorter in time, and therefore require higher resolution timers to obtain precise phase difference time measurements. One non-limiting example of when phase differences become shorter is when a small Coriolis flow meter is made of a material, such as silicon, that is capable of vibrating at high frequencies and is used to measure relatively small flow rates. In this and other examples, a single phase difference measurement taken with a low resolution timer may have a high potential for error or unacceptable imprecision, and therefore yield imprecise information about characteristics of the fluid flowing through the conduit 106, such as the mass flow rate.

To illustrate this issue by way of non-limiting example, a fluid may flow through the conduit 106 along arrows 124 to cause the conduit 106 to resonate at a frequency of 25 kHz. In this example, the 25 kHz sine wave may complete a full 360-degree cycle in 40 microseconds, and the phase difference between the respective vibrations of the first and second portions 108 and 110 may be 111.11 nanoseconds. However, a timer having a 100 MHz clock has a resolution of only 10 nanoseconds. Therefore, the timer will time the phase difference as either 110 nanoseconds or 120 nanoseconds, and will not be able to determine the true phase difference of 111.11 nanoseconds. The illustrative embodiments address this and other issues.

Figure 3A:
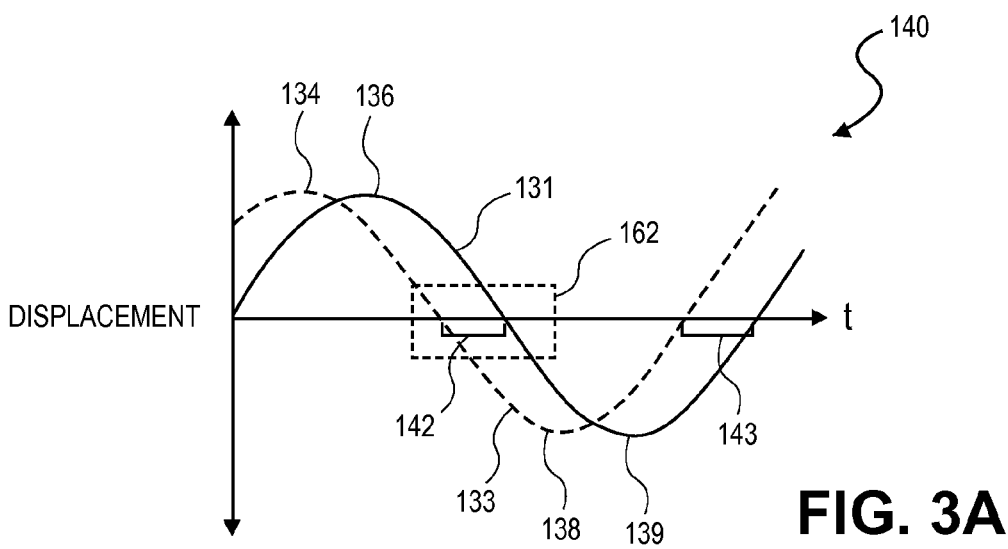
FIG. 3A is a schematic graph showing the displacement of the conduit in FIGS. 1A and 1B versus time when a fluid is being transferred through the conduit in a first direction.
Figure 3B:
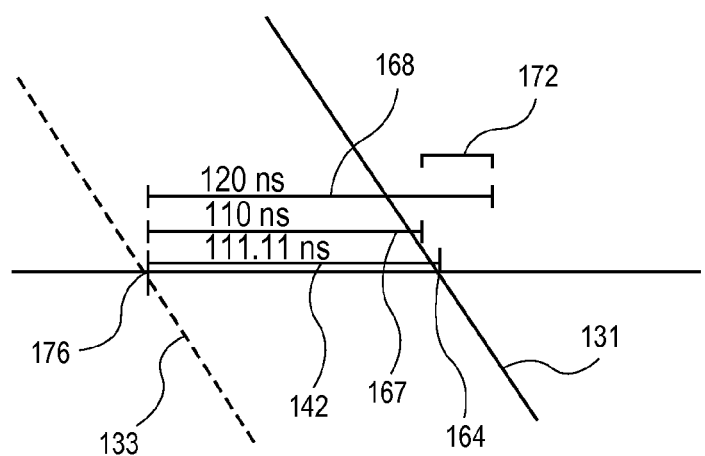
FIG. 3B is a close-up view of a portion of the schematic graph of FIG. 3A.
Figure 4:
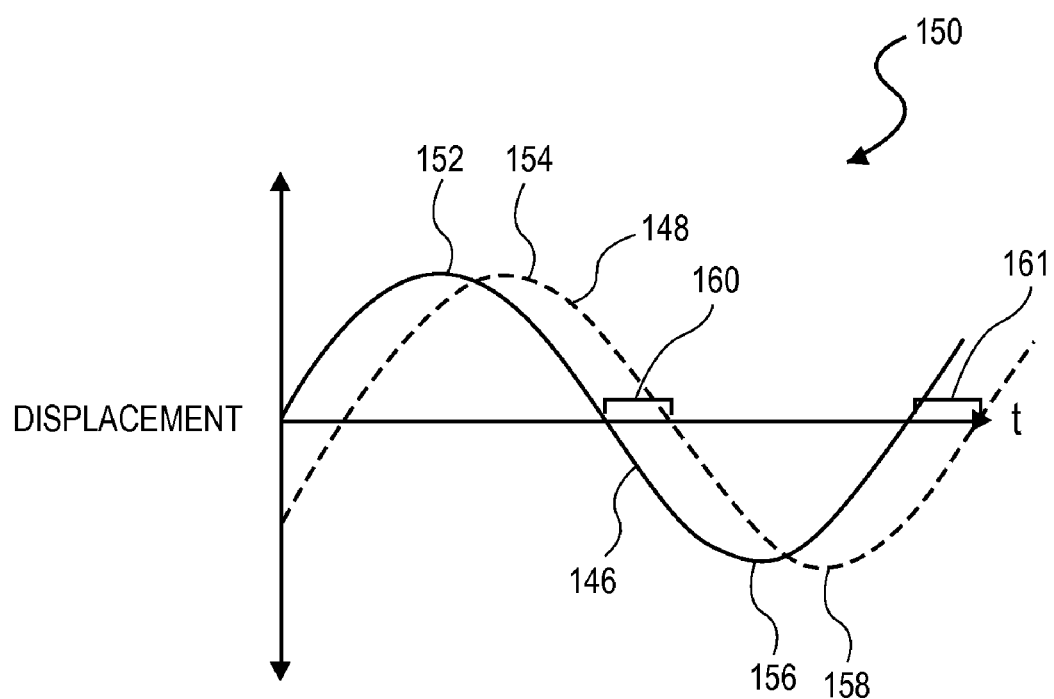
FIG. 4 is a schematic graph showing the displacement of the conduit in FIGS. 1A and 1B versus time when a fluid is being transferred through the conduit in a second direction that is opposite from the first direction.

This non-limiting example is illustrated in FIG. 3B, which shows a close-up view of portion 162 of graph 140 in FIG. 3A.

The phase difference 142 is 111.11 nanoseconds, which occurs between a first timer measurement 167 of 110 nanoseconds and a second timer measurement 168 of 120 nanoseconds. In one embodiment, the frequency of the vibration of the conduit 106 is asynchronous to the sampling frequency of the timer 170 used to measure the phase difference 142. Thus, the probability distribution of the zero-crossing point 164 detected by a detector 166 occurring between the first and second timer measurements 166 and 168, which is represented by time span 172, is linear. That is, the probability that the zero-crossing point 164 occurs at any particular time during time span 172 is equal. For example, the zero-crossing point 164 may occur just after the first timer measurement 167, just before the second timer measurement 168, or any other point during time span 172 with equal probability.

In one embodiment, the system 100 is capable of using these principles to obtain a more precise measure of the phase difference 142, which may, in turn, be used to obtain more precise characteristics of the fluid flowing through the conduit 106. In particular, the system 100 is capable of obtaining the average phase difference 102 using the plurality of phase differences 114 that are obtained by the timer 170 and stored in the queue 112.

The vibration and associated vibrational characteristics of the first and second portions 108 and 110 may be detected by detectors 166 and 174, respectively. For example, the detectors 166 and 174 may measure the vibrational characteristics of the first and second portions 108 and 110 that are represented by waveforms 131 and 133, respectively, on graph 140. These vibrational characteristics include the phase of the vibrations of the first and second portions 108 and 110. The detector signals, such as waveforms 131 and 133 in FIG. 3A, may be measured using analog electronics. For example, the detectors 166 and 174 may utilize one of several measurement principles (e.g. optical, electrical, or magnetic). The analog signal from the detectors 166 and 174 may then be passed to an analog comparator to rapidly distinguish if the sine wave emitted is above or below "zero" (each comparator's inputs are the measured signal, and ground). Since both detectors 166 and 174 are measured the same way, there will usually be a "matched pair" of "analog comparators", so that their speed of response may be quite close in time. The use of analog electronics to measure the detector signals can facilitate the asynchronicity between the measured frequency of the conduit 106 and the sampling frequency of the timer 170.

The timer 170 may be used to measure the phase difference 142 between the phases of the vibrations of the first and second portions 108 and 110. The timer 170 may have any resolution or sampling frequency, and may be a digital timer that obtains digital timer values. In addition, the sampling frequency of the timer 170 may be asynchronous to the frequency of the vibration of the conduit 106. In one example, the timer 170 may count upward from zero when the zero-crossing 176 of the waveform 133, which corresponds to the vibration of the second portion 110, occurs; in this example, the timer 170 may cease to count upward at the zero-crossing point 164 of the waveform 131, which corresponds to the vibration of the first portion 108, thereby measuring a phase difference at the resolution of the timer 170. In another example, which may occur in the graph 150 in FIG. 4, the timer 170 may count downward from zero when the zero-crossing of the waveform 146 occurs; in this example, the timer 170 may cease to count downward at the zero-crossing of the waveform 148.

The phase difference that is measured by the timer 170 may be stored in the queue 112. The queue 112 is operable to store one or more values associated with a plurality of phase differences, including plurality of phase differences 114 themselves. The queue 112 may be able to store any number of phase differences. In one non-limiting example, the queue 112 may have a size n that equals $2^x$, such as 2048 (2 to the power of 11); in this example, x may be any integer. Also, although the queue 112 may be any type of queue or memory device, the queue 112 shown in FIG. 1A is a first-in, first out queue having a capacity of n phase differences.

As the conduit 106 vibrates over time, more phase differences obtained by the timer 170 are accumulated in the queue 112 until the queue 112 is filled to its capacity of n phase differences. Thus, some time may be required to fill the queue 112 to capacity. By way of non-limiting example, if the conduit 106 vibrates at 25 kHz, a queue 112 having a capacity of 2048 queue differences will be filled to capacity after 0.04096 seconds. Once the queue 112 reaches capacity, the oldest entry in the queue 112 is removed as a new phase difference is added to the queue 112.

The processor 178 is operable to calculate the average phase difference 102 using the phase differences 114 stored in the queue 112. That is, the processor 178 calculates an average of the phase differences stored in the queue 112 to obtain the average phase difference 102. The average phase difference 102 calculated by the processor 178 may have an overall time resolution that is "finer" than the clock rate, or sampling frequency, of the timer 170. In an example in which the queue 112 is not filled to capacity n, the processor 178 may calculate the average phase difference 102 by summing the phase differences 114 stored in the queue 112 to form a sum, and dividing this sum by the number of phase differences stored in the queue 112 to obtain the average phase difference 102. Thus, in a non-limiting simple example in which the queue 112 has a capacity of 4, and contains the phase differences of 2, 2, and 3, the processor 178 may sum these phase differences to obtain a sum of 7, and divide this sum by 3 to obtain an average phase difference 102 of 2.333.

In an example in which the queue 112 is filled to capacity, the processor 178 may calculate the average phase difference 102 by summing the phase differences 114 stored in the queue 112 to form a sum, and dividing this sum by the size, or capacity n, of the queue 112. Thus, in a non-limiting simple example in which the queue 112 has a capacity of 4, and contains the phase differences of 2, 2, 3, and 3, the processor 178 may sum these phase differences to obtain a sum of 10, and divide this sum by 4 to obtain an average phase difference 102 of 2.5. Because old phase differences are removed from the queue 112 as new phase differences are added, the processor 178 is capable of continuously calculating a moving average that changes over time. Thus, the changing fluid characteristics of the fluid flowing through the conduit 106 are reflected in the average phase difference 102 calculated by the processor 178. The frequency at which the processor 178 calculates the average phase difference 102 may vary, including, for example, performing a new calculation each time a measurement is added to the queue 112.

In another embodiment, the queue 112 may be any memory capable of storing data, and the data contained thereon need not be organized in a queue-like manner. In this embodiment, a sum of the plurality of phase differences measured by the timer 170 may be stored by the memory. The memory may also store a number, or counter, of phase differences that have been measured by the timer 170. The sum and the number of phase differences may be updated on the memory each time a new phase difference is measured by the timer 170, thus keeping a running total of these values. The processor 178 may, at any time, calculate the average phase difference 102 based on the sum and number of phase differences stored in the memory, which may be continuously updated as phase difference measurements are made. By way of simple non-limiting example, the phase differences of 2, 2, and 3 may have been measured by the timer 170. In this example, the memory may store a sum of 7 and counter value of 3. The timer 170 may then measure a new phase difference of 3, whereupon the sum is updated to 10 and the counter value is updated to 4. The processor 178 may then calculate the average phase difference 102 as 2.5. In one example of this embodiment, the memory does not actually store the phase differences 114, and instead stores the sum and the counter value.

The processor 178, or any other component of the system 100, may also output the average phase difference 102. Once outputted, the average phase difference 102 may be used for any purpose, such as to calculate characteristics (e.g., mass flow rate) of the fluid flowing through the conduit 106. By way of non-limiting example, the average phase difference 102 may be presented to subsequent digital processing steps in the Coriolis flow meter 104 or processor 178 for use in various operations, such as to calculate the mass flow rate of a fluid being transferred through the conduit 106, scale the mass flow rate for display to a user, pass the average phase difference 102 or other parameter through digital communications channels to other equipment, control valves to change the mass flow rate, etc.

The rate at which the average phase difference 102 is outputted may depend on the application in which the Coriolis flow meter 104 is being used. For example, the average phase difference 102 may be outputted less frequently than the processor 178 calculates the average phase difference 102. This may occur, for example, when a user only has a need to know fluid characteristics, such as mass flow rate, at particular time intervals, such as 0.1 seconds or any other time. In fact, the frequency at which the average phase difference 102 is outputted may be defined by a user.

The processor 178, the queue 112, the timer 170, and other components of the system 100 may be implemented using a variety of different hardware media. In one embodiment, at least one of the processor 178, the queue 112, and the timer 170 may be implemented on an integrated circuit, such as an application-specific integrated circuit (ASIC). In another embodiment, at least one of the processor 178, the queue 112, and the timer 170 may be implemented on a field-programmable gate array (FPGA). These components may also be implemented using a dedicated co-processor with an on-chip timer. Also, although FIG. 1A shows the processor 178, the queue 112, and the timer 170 as separate functional units, any two of these components are combinable into a single unit. For example, the processor 178, the queue 112, and the timer 170 may all be implemented on a processor.

Figure 5:
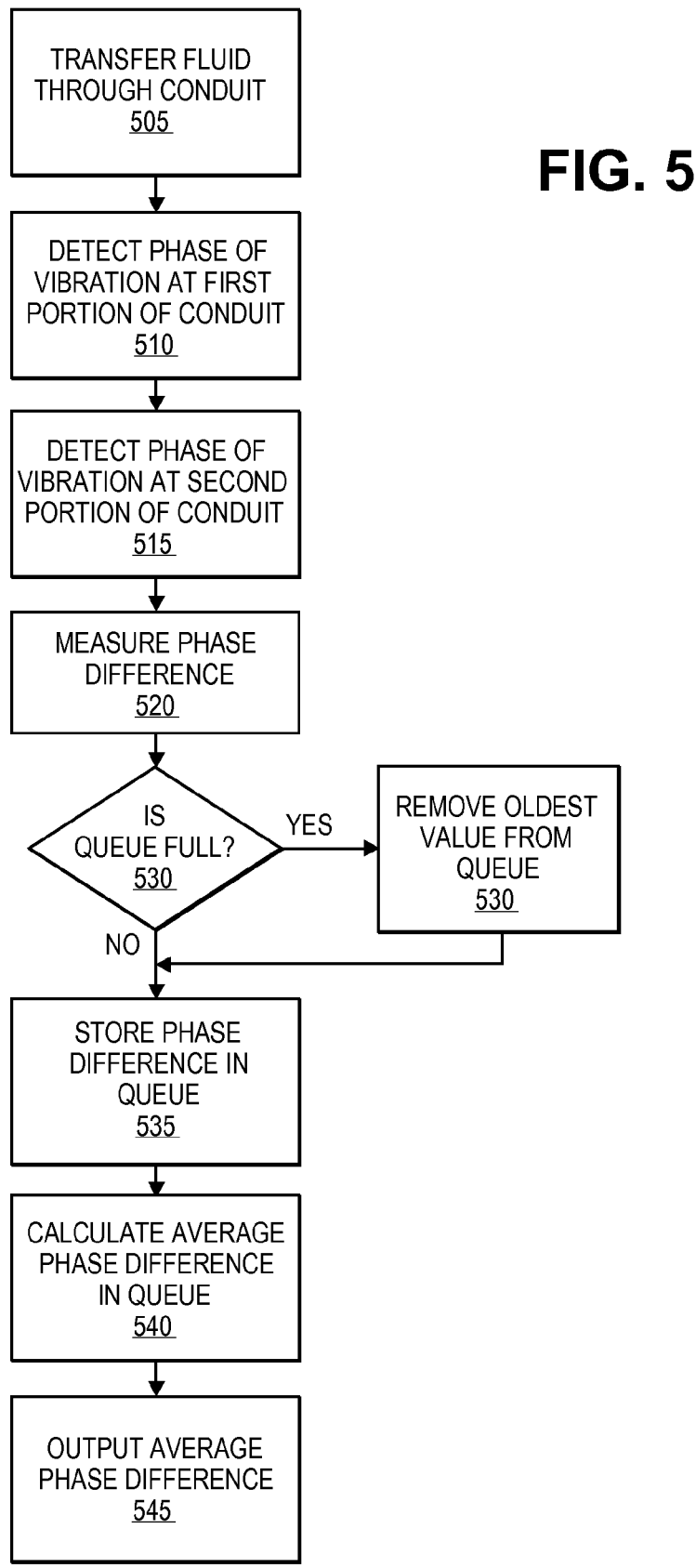
FIG. 5 is a schematic flowchart showing a process for calculating an average phase difference in a Coriolis flow meter according to an illustrative embodiment.

Referring to FIG. 5, a process for calculating an average phase difference in a Coriolis flow meter is shown according to an illustrative embodiment. The process shown in FIG. 5 may be implemented by the system 100 shown in FIG. 1A.

The process begins by transferring a fluid through a conduit (step 505). The fluid causes a first portion of the conduit to vibrate out-of-phase with a second portion of the conduit. The process detects the phase of vibration at the first portion of the conduit (step 510). The process also detects the phase of vibration at the second portion of the conduit (step 515). The process measures the phase difference between the vibrations of the first and second portions of the conduit (step 520).

The process may then determine whether the queue is full (step 525). If the process determines that the queue is full, then the process removes the oldest value from the queue (step 530). The process then proceeds to step 535 and stores the phase difference in the queue.

Returning to step 525, if the process determines that the queue is not full, the process stores the phase differences in the queue (step 535). The process may then calculate the average phase difference using the plurality of phase differences stored in the queue (step 540). The process then outputs the average phase difference (step 545).

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. These functions may be hardware-implemented, such as by using an ASIC, FPGA, processor, or other hardware. In some alternative implementations, the function or functions noted in the block may occur out of the order noted in the Figures. For example, in some cases, two blocks shown in succession may be executed substantially concurrently, or the blocks may sometimes be executed in the reverse order, depending upon the functionality involved.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed is:

1. A system for calculating an average phase difference in a Coriolis flow meter, the system comprising:
   a conduit for transferring a fluid, the conduit vibrating when the fluid flows through the conduit;
   a first detector operable to detect a first vibration at a first portion of the conduit, the first detector measuring the phase of the first vibration;
   a second detector operable to detect a second vibration at a second portion of the conduit, the second detector measuring the phase of the second vibration;
   a timer operable to measure a phase difference between the phase of the first vibration and the phase of the second vibration;
   a memory operable to store one or more values associated with a plurality of phase differences, the plurality of phase differences including the measured phase difference; and
   a processor operable to calculate an average phase difference using the one or more values.

2. The system of claim 1, wherein the memory is a queue, and wherein the one or more values is the plurality of phase differences.

3. The system of claim 2, wherein the queue is a first-in, first-out queue.

4. The system of claim 2, wherein the queue has a size n, wherein $n=2^x$, and wherein x is an integer.

5. The system of claim 1, wherein the one or more values includes a sum of the plurality of phase differences, and wherein the one or more values further includes a number of phase differences in the plurality of phase differences, and wherein the processor is operable to calculate the average phase difference by dividing the sum by the number of phase differences.

6. The system of claim 5, wherein the sum and the number of phase differences are updated when the phase difference is measured.

7. The system of claim 1, wherein the timer is a digital timer.

8. The system of claim 7, wherein the timer has a 100 MHz sampling frequency.

9. The system of claim 1, wherein the conduit vibration is asynchronous to a sampling frequency of the timer.

10. The system of claim 1, wherein the first detector and the second detector use analog electronics.

11. The system of claim 1, wherein the phase difference is an integer.

12. The system of claim 1, further comprising:
an application specific integrated circuit that includes the memory and the processor.

13. The system of claim 1, further comprising:
a field-programmable gate array that includes the memory and the processor.

14. The system of claim 1, wherein the first portion is one of an inlet portion and an outlet portion, and wherein the second portion is the other of the inlet portion and the outlet portion.

15. The system of claim 1, wherein the conduit is formed from silicon.

16. The system of claim 1, wherein each of the plurality of phase differences is measured by the timer.

17. A method for calculating an average phase difference in a Coriolis flow meter, the method comprising:
transferring a fluid through a conduit, the fluid causing a first portion of the conduit to vibrate in a first phase and further causing a second portion of the conduit to vibrate in a second phase;
measuring a phase difference between the first phase and the second phase;
storing one or more values associated with a plurality of phase differences in a memory, wherein the plurality of phase differences includes the measured phase difference;
calculating an average phase difference based on the one or more values stored in the memory;
outputting the average phase difference;
computing a fluid parameter as a function of the average phase difference; and
displaying the fluid parameter for a user to view.

18. The method of claim 17, further comprising:
detecting the first phase using a first detector; and
detecting the second phase using a second detector.

19. The method of claim 17, wherein the one or more values includes a sum of the plurality of phase differences, and wherein the one or more values further includes a number of phase differences in the plurality of phase differences, and wherein calculating the average phase difference includes dividing the sum by the number of phase differences.

20. The method of claim 19, further comprising:
determining the sum and the number of phase differences in response to measuring the phase difference.

21. The method of claim 17, wherein the memory is a queue.

22. The method of claim 21, wherein storing the phase difference in the queue includes removing an oldest phase difference from the queue in response to determining that the queue is full.

23. The method of claim 22, wherein calculating the average phase difference includes summing the plurality of phase differences stored in the queue to form a sum, and dividing the sum by a maximum capacity of the queue.

24. The method of claim 21, wherein calculating the average phase difference is in response to storing the phase difference in the queue.

25. The method of claim 17, wherein outputting the average phase difference occurs repeatedly at a predefined time interval.

26. The method of claim 25, wherein the predefined time interval is defined by a user.

27. The method of claim 17, further comprising:
measuring each of the plurality of phase differences using a timer.

28. The method of claim 17, where the fluid parameter is mass flow rate.

29. The method of claim 28, further comprising, in response to computing the mass flow rate, adjusting a control valve to change the mass flow rate.

30. The method of claim 17, wherein outputting the average phase difference occurs repeatedly at a predefined time interval.

31. An apparatus for calculating an average phase difference in a Coriolis flow meter, the apparatus comprising:
a timer operable measure a phase difference between vibrations of a first and second portion of a conduit in the Coriolis flow meter;
a memory operable to store one or more values associated with a plurality of phase differences, the plurality of phase differences including the phase difference measured by the timer; and
a processor operable to calculate an average phase difference using the one or more values.

32. A system for calculating an average phase difference in a Coriolis flow meter, the system comprising:
a conduit for transferring a fluid, the conduit vibrating when the fluid flows through the conduit;
a first detector operable to detect a first vibration at a first portion of the conduit, the first detector measuring the phase of the first vibration;
a second detector operable to detect a second vibration at a second portion of the conduit, the second detector measuring the phase of the second vibration;
a timer operable to measure a phase difference between the phase of the first vibration and the phase of the second vibration;
a memory operable to store one or more values associated with a plurality of phase differences, the plurality of phase differences including the measured phase difference, the memory being a queue of size n, n=$2^x$ and x is an integer, the one or more values being the plurality of phase differences; and
a processor operable to calculate an average phase difference using the one or more values.

33. The system of claim 32, wherein the queue is a first-in, first-out queue.

34. The system of claim 32, wherein the one or more values includes a sum of the plurality of phase differences, and wherein the one or more values further includes a number of phase differences in the plurality of phase differences, and wherein the processor is operable to calculate the average phase difference by dividing the sum by the number of phase differences.

35. The system of claim 32, wherein the sum and the number of phase differences are updated when the phase difference is measured.

36. The system of claim 32, wherein the conduit is formed from silicon.

37. A method for calculating an average phase difference in a Coriolis flow meter, the method comprising:

transferring a fluid through a conduit, the fluid causing a first portion of the conduit to vibrate in a first phase and further causing a second portion of the conduit to vibrate in a second phase;

measuring a phase difference between the first phase and the second phase;

storing one or more values associated with a plurality of phase differences in a memory, wherein the plurality of phase differences includes the measured phase difference;

calculating an average phase difference based on the one or more values stored in the memory;

outputting the average phase difference;

computing a fluid parameter as a function of the average phase difference; and in response to computing the fluid parameter, adjusting a control valve to change mass flow rate of a fluid.

38. The method of claim 37, wherein the fluid parameter is mass flow rate.

39. The method of claim 37, wherein the one or more values includes a sum of the plurality of phase differences, and wherein the one or more values further includes a number of phase differences in the plurality of phase differences, and wherein calculating the average phase difference includes dividing the sum by the number of phase differences.

40. The method of claim 37, further comprising:

determining the sum and the number of phase differences in response to measuring the phase difference.

41. The method of claim 37, further comprising calculating an average phase difference by summing the plurality of phase differences stored to form a sum, and dividing the sum by a maximum capacity of memory cells.

42. The method of claim 37, further comprising displaying the fluid parameter for a user to view.

* * * * *